United States Patent
Tsujigawa et al.

(10) Patent No.: US 6,377,569 B1
(45) Date of Patent: *Apr. 23, 2002

(54) TALKING SYSTEM USING INTERNET PHONE SERVER DEVICES AND DATA COMMUNICATION LINE

(75) Inventors: Takuji Tsujigawa, Fukuoka-ken; Daisuke Wada, Kasuga, both of (JP)

(73) Assignee: Matsushita Electric Industrial Co., Ltd., Osaka (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/996,881

(22) Filed: Dec. 23, 1997

(30) Foreign Application Priority Data

Jan. 22, 1997 (JP) .............................. 9-009330

(51) Int. Cl.[7] .......................... H04L 12/66; H04L 12/28
(52) U.S. Cl. ....................................... 370/352; 370/401
(58) Field of Search ............................. 370/352, 356, 370/260, 265, 401, 465; 379/118, 89, 93.23; 709/228

(56) References Cited

U.S. PATENT DOCUMENTS

| | | | | |
|---|---|---|---|---|
| 5,726,984 A | * | 3/1998 | Kubler et al. ............... 370/349 |
| 5,835,724 A | * | 11/1998 | Smith .................... 395/200.57 |
| 5,838,665 A | * | 11/1998 | Kahn et al. .................. 370/260 |
| 5,867,495 A | * | 2/1999 | Elliott et al. ................ 370/352 |
| 5,883,891 A | * | 3/1999 | William et al. .............. 370/356 |
| 6,078,582 A | * | 6/2000 | Curry et al. ................ 370/356 |
| 6,097,804 A | * | 8/2000 | Gilbert et al. .............. 379/230 |
| 6,108,329 A | * | 8/2000 | Oyama et al. .............. 370/352 |
| 6,108,704 A | * | 8/2000 | Hutton et al. ............... 709/227 |
| 6,125,113 A | * | 9/2000 | Farris et al. ................ 370/389 |

OTHER PUBLICATIONS

C. Yang, INETPhone: Telephone service and servers on Internet, University of North Texas, 1–6, Apr. 1995.*

* cited by examiner

*Primary Examiner*—Alpus H. Hsu
*Assistant Examiner*—Duc Ho
(74) *Attorney, Agent, or Firm*—Venable; Robert J. Frank; Catherine M. Voorhees

(57) ABSTRACT

An Internet phone server device includes a database storing users' telephone numbers and nearby ISPA information, a telephone number acquiring unit for acquiring the telephone number of the other party in response to user's call origination, an ISPA acquiring unit for obtaining the nearby ISPA of the terminating side from the acquired telephone number, and an ordinary public line calling unit for originating a call to a terminating Internet phone from the ISPA of the terminating side by using an ordinary public line. At an arbitrary time, the user originates a call. Even if the other-party does not communicate using IP connection, an communication can be effected.

13 Claims, 5 Drawing Sheets

| USER ID | PASSWORD | BILLING INFORMATION | USER SPECIFIC INFORMATION (PLACE OF RESIDENCE / ELECTRONIC MAIL ADDRESS / TELEPHONE NUMBER / NEARBY ISPA / ORDINARY TELEPHONE USE) |
|---|---|---|---|
| 123456789 | XXXXXXXX | 654321 | ................... |
| 123456789 | XXXXXXXX | 123456 | 73 ................... |
| 123456789 | XXXXXXXX | 9875 | ................... |
| 123456789 | XXXXXXXX | 1234 | ................... |
| | | | |

71 72

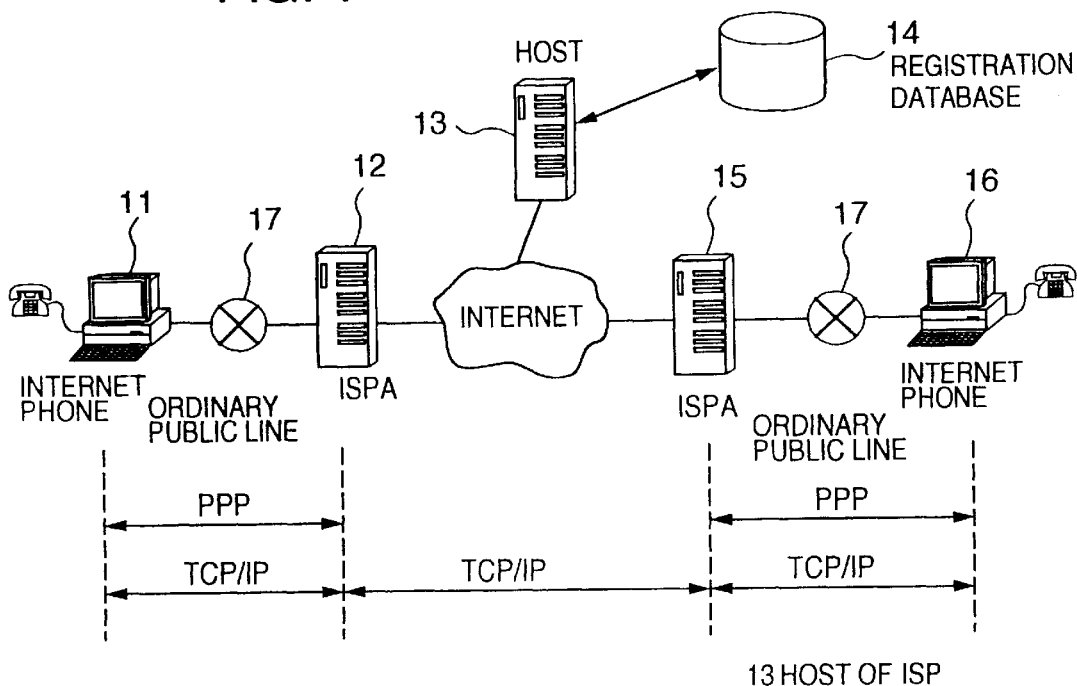
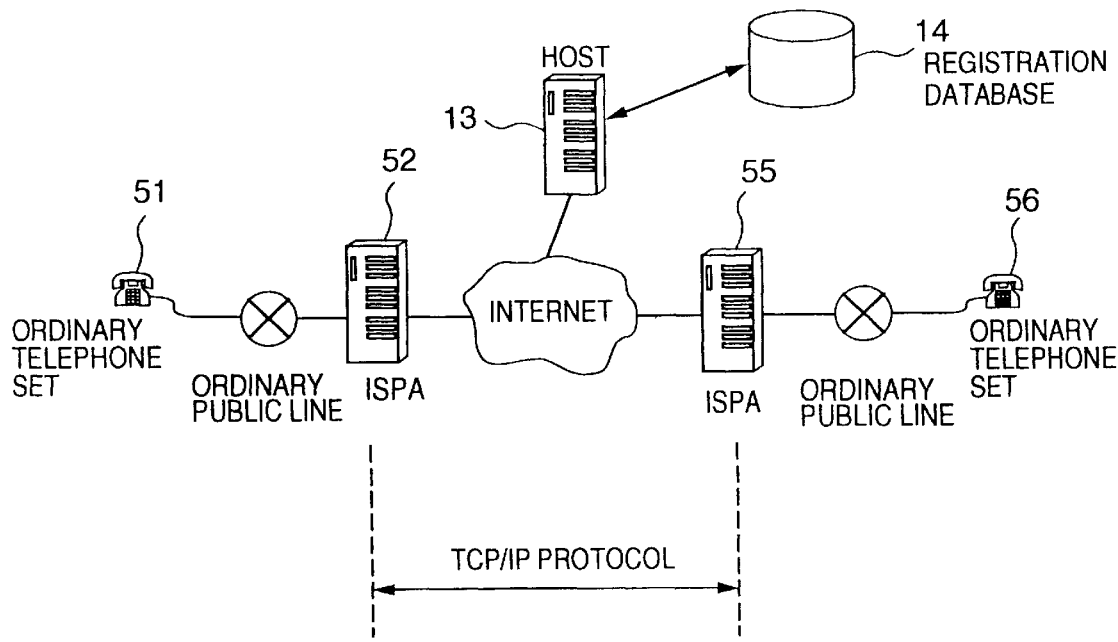

FIG. 8
PRIOR ART

| USER ID | PASSWORD | BILLING INFOR-MATION | USER SPECIFIC INFORMATION (PLACE OF RESIDENCE / ELECTRONIC MAIL ADDRESS) |
|---|---|---|---|
| ZY45862T | XXXXXXXX | 654321 | ................... |
| QQQ12345 | XXXXXXXX | 654321 | ................ |
| A1B2C3D4 | XXXXXXXX | 654321 | ................. |
| USERID12 | XXXXXXXX | 654321 | ................. |
| ⋮ | ⋮ | ⋮ | ⋮ |

TALKING SYSTEM USING INTERNET PHONE SERVER DEVICES AND DATA COMMUNICATION LINE

BACKGROUND OF THE INVENTION

The present invention relates to a talking system using Internet phone server devices and a data communication line.

In recent years, Internet service systems allowing ordinary public telephone lines to use the Internet have been provided by Internet service providers (hereafter referred to as ISP) and use of the Internet by the general public has been widespread. Furthermore, mutual speech communication using the Internet called Internet phone has become possible. Hereafter, the conventional Internet phone server will be described.

First of all, a user originates a telephone call from an ordinary public telephone line to a nearby ISP access point (hereafter referred to as ISPA) by using an Internet phone device. Thus, a point to point protocol (hereafter referred to as PPP) connection is conducted.

In the ISPA, a unique address determined by a standard protocol of the Internet (hereafter referred to as TCP/IP) called an IP address is automatically assigned to each Internet phone device of the user side. The Internet phone device and the ISPA are TCP/IP-connected. This is usually called a dial up IP connection.

From an Internet phone information site existing on the Internet (for example, existing in a host of the ISP in the present description), the user then knows other users who similarly conduct dial up IP connections from Internet phone devices. The user thus arbitrarily selects another party for communication, and mutual speech communication is conducted by using the Internet.

FIG. 8 is an information content diagram of a database existing in a host of a conventional ISP system. The information contents include user IDs, passwords, billing information, and user specific information.

In the above described conventional configuration, however, the users desiring mutual communication must mutually dial up IP connections via the ISPAs beforehand. Furthermore, line use charges and ISP use charges are made during that time.

SUMMARY OF THE INVENTION

An object of the present invention is to provide a talking system using Internet phone server devices and a data communication line which eliminates the above described problems, which uses the Internet, which improves the convenience so that the user may originate a call and be connected to the terminating side at an arbitrary time, and which makes possible use at more inexpensive rates.

In order to achieve this object, a talking system according to the present invention includes telephone number acquiring means for acquiring a terminating telephone number from a calling terminal, access point acquiring means for searching a database on the basis of the acquired terminating telephone number to acquire a nearby access point of the terminating side, and calling means for conducting calling connection from the nearby access point of the terminating side to the terminating terminal.

BRIEF DESCRIPTION OF THE DRAWING

FIG. 1 is a network configuration diagram at the time when mutual speech communication is conducted with Internet phone devices utilizing public telephone lines in a first embodiment of the present invention;

FIG. 5 is a network configuration diagram in a second embodiment of the present invention;

FIG. 8 is an information content diagram of a database existing in a host of a conventional ISP system.

DESCRIPTION OF THE PREFERRED EMBODIMENTS (First Embodiment)

Figure 2:
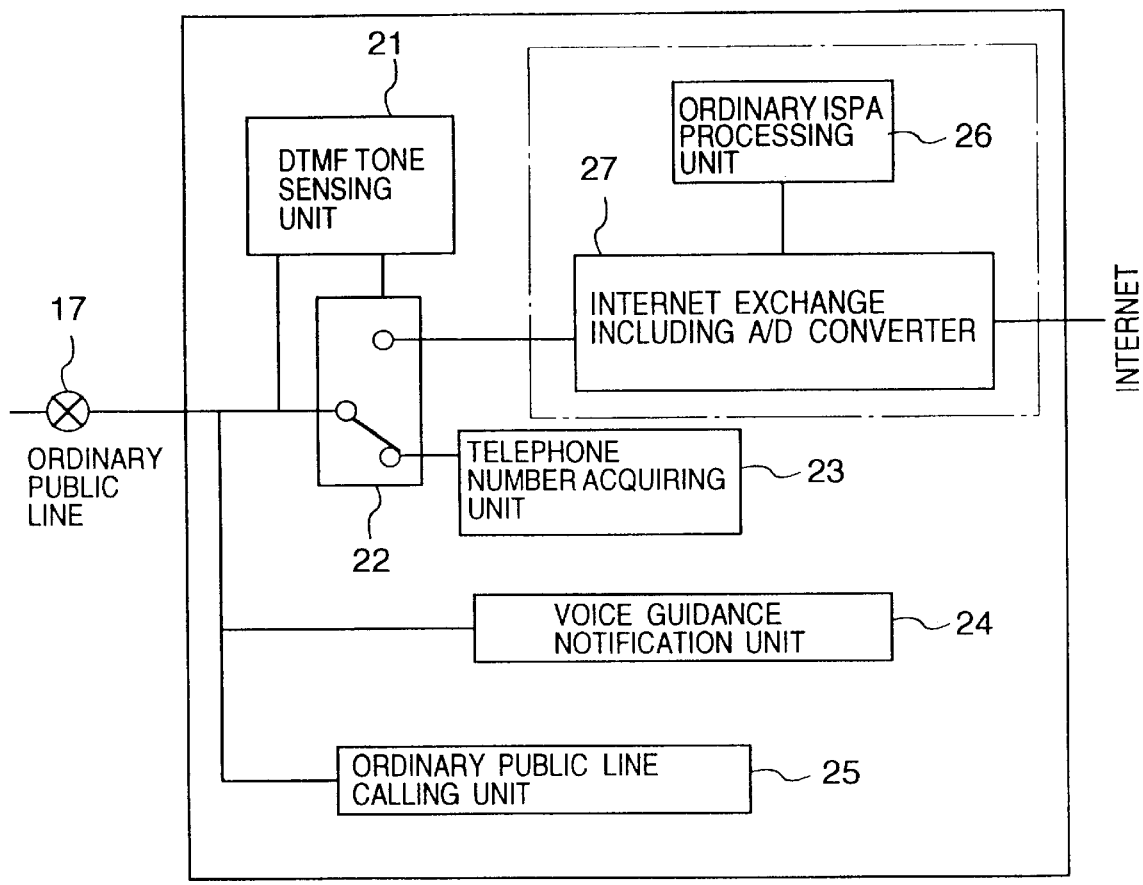
FIG. 2 is an ISPA configuration diagram in the first embodiment of the present invention.
Figure 3:
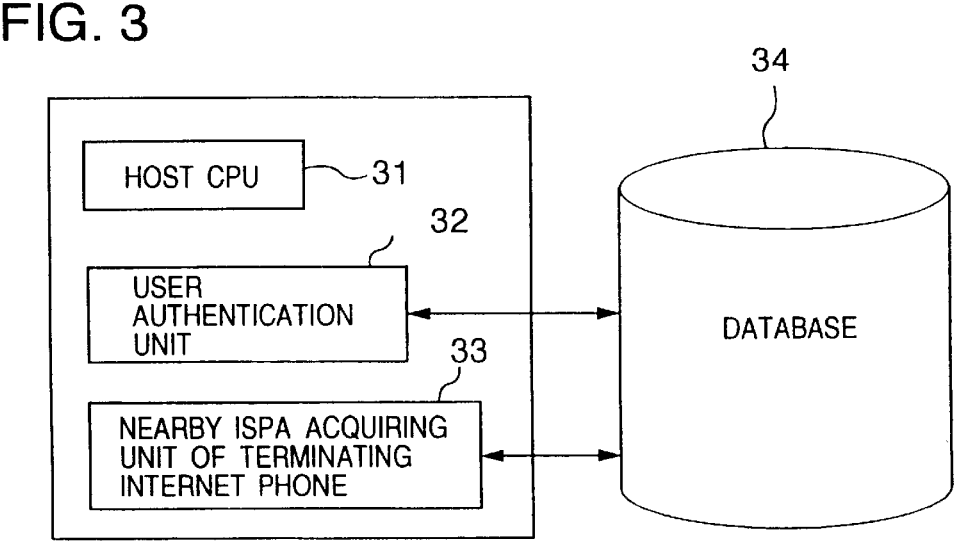
FIG. 3 is a host function diagram of an ISP system in the first embodiment of the present invention.
Figure 4:
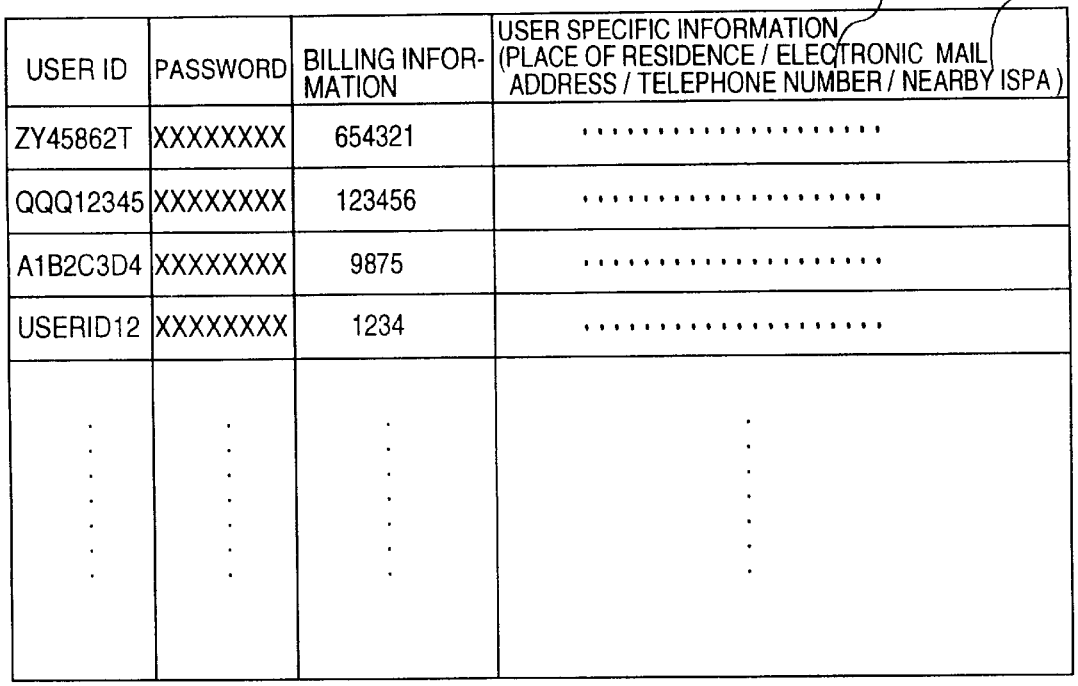
FIG. 4 is an information content diagram of a database in the first embodiment of the present invention.

FIG. 1 is a network configuration diagram at the time when mutual speech communication is conducted with Internet phone devices utilizing public telephone lines in a first embodiment of the present invention. FIG. 2 is an ISPA configuration diagram in the first embodiment of the present invention. FIG. 3 is a host function diagram of an ISP system in the first embodiment of the present invention. FIG. 4 is an information content diagram of a database in the first embodiment of the present invention.

In FIG. 1, reference numerals 11 and 16 denote Internet phones, 12 and 15 ISPAs, 13 an ISP host, 14 a registration database, and 17 an ordinary public line. In FIG. 2, reference numeral 21 denotes a DTMF tone sensing unit, 22 an input/output changeover switch of an ordinary public line, 23 a telephone number acquiring unit, 24 a voice guidance notification unit, 25 an ordinary public line calling unit, 26 a CPU, i.e., a central processor unit, and 27 an Internet exchange including an A/D converter. In FIG. 3, reference numeral 31 denotes a host CPU, 32 a user authentication unit, 33 a unit for acquiring an ISPA located near a terminating Internet phone, and 34 a database.

Hereafter, operation will be described. First of all, a caller conducts dial up IP connection from the Internet phone 11. After the connection, the ISPA 12 transmits a voice guidance such as "Enter the telephone number of the other party" prepared according to the protocol of the TCP/IP to the caller by using the voice guidance notification unit 24. If the caller enters a telephone number (i.e., conducts DTMF tone input), it is recognized as telephone number input by the DTMF tone sensing unit 21 of the ISPA. The DTMF tones are decoded by the telephone number acquiring unit 23. The telephone number of the other party is thus obtained.

The CPU 26 of the ISPA 12 of the caller side sends this telephone number of the other party to the host CPU 31 of the host 13 of the system. The host CPU 31 of the host 13 searches the database 34 on the basis of the telephone number of the other party and finds an ISPA 15 located near the other party. The host CPU 31 of the host 13 notifies the caller side ISPA of the ISPA located near the other party, and notifies the ISPA located near the other party of the caller side ISPA and the telephone number of the other party. By using the obtained telephone number of the other party and the ordinary public line calling unit 25, the ISPA 15 located near the other party originates a call toward the Internet phone 16 of the called party via an ordinary telephone line. If call incoming is conducted at the terminating Internet phone 16, then the ISPA 15 conducts the PPP connection and the TCP/IP connection and provides the terminating Internet phone 16 with an IP address. The ISPA 15 of the other party gives notice of the IP address of the terminating Internet phone 16 to the calling Internet phone 11 via the host 13. In the same way, the ISPA 15 of the other party gives notice of the IP address of the calling Internet phone 11 to the Internet phone 16 of the called party. By the operation heretofore described, speech communication via the Internet can be effected.

(Second Embodiment)

Figure 7:
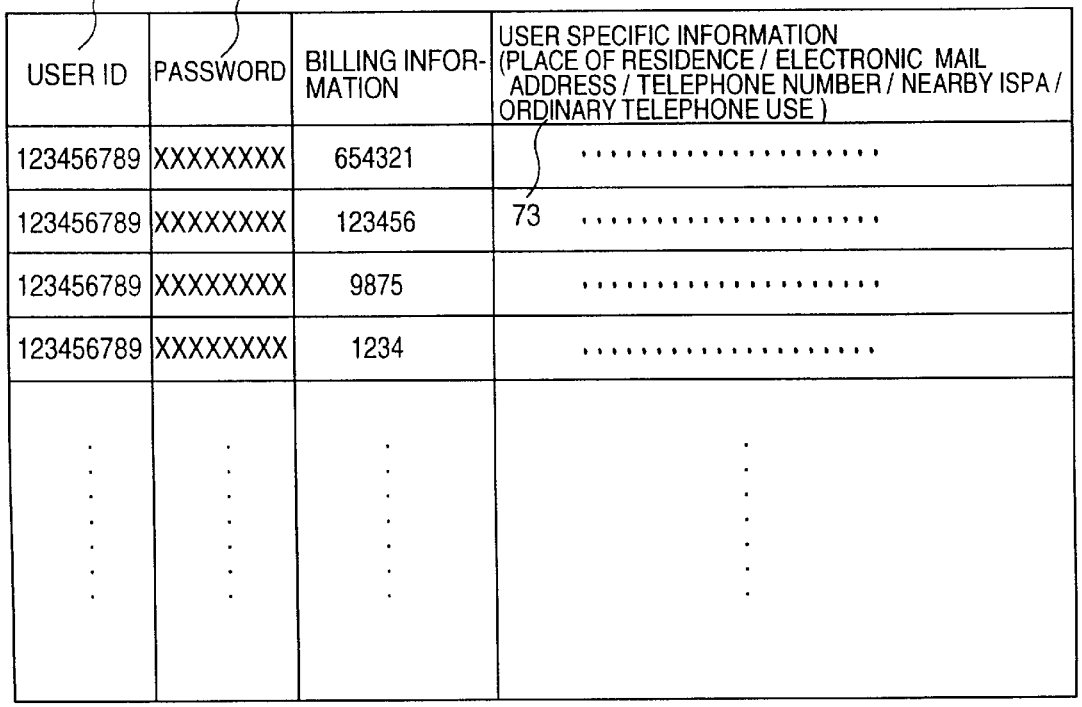
FIG. 7 is an information content diagram of a database in the second embodiment of the present invention.
Figure 6:
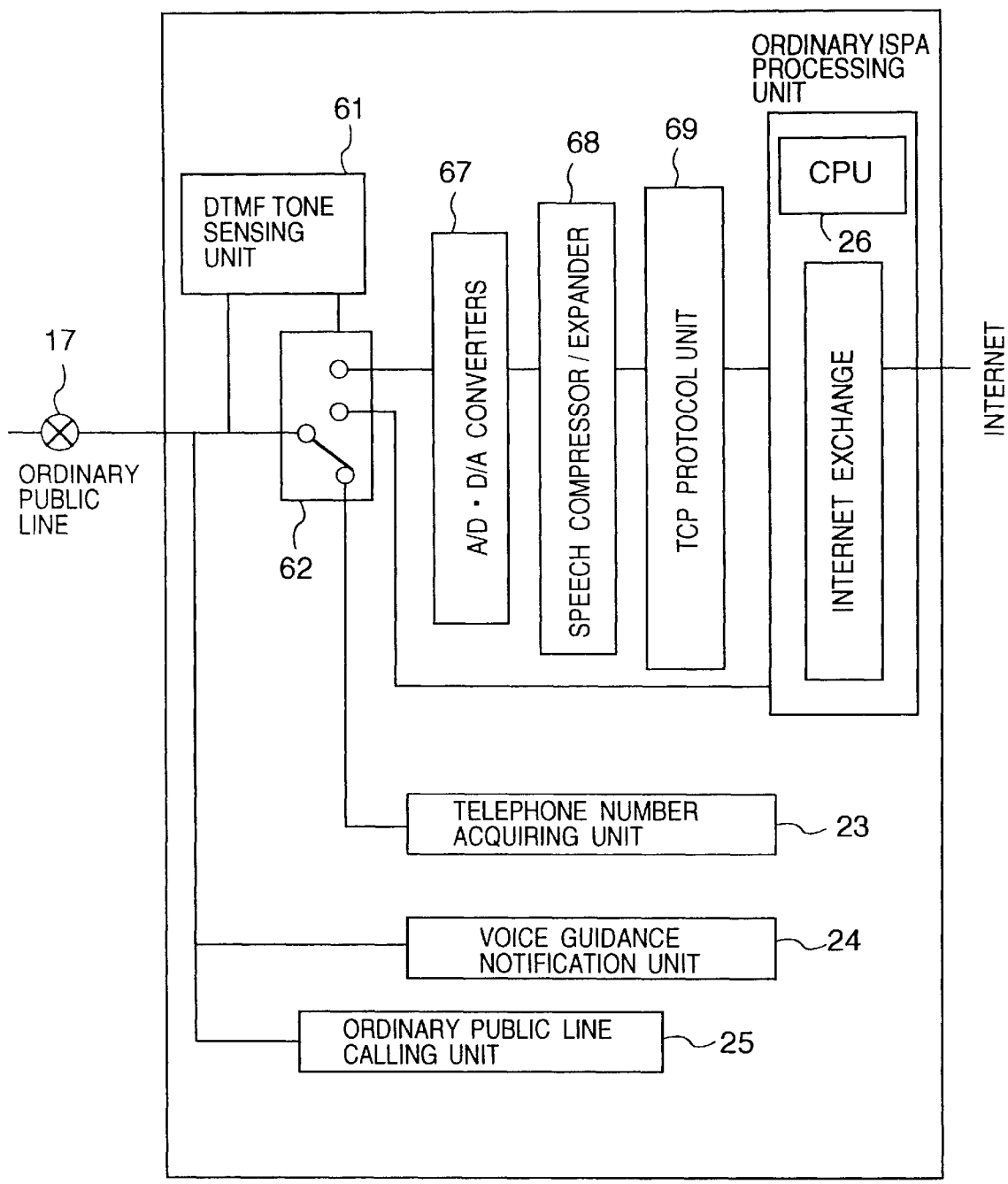
FIG. 6 is an ISPA configuration diagram in the second embodiment of the present invention.

FIG. 5 is a network configuration diagram in a second embodiment of the present invention. FIG. 6 is an ISPA configuration diagram in the second embodiment of the present invention. FIG. 7 is an information content diagram of a database in the second embodiment of the present invention. In FIG. 5, reference numerals 51 and 56 denote ordinary telephone sets, and 52 and 55 ISPAs. In FIG. 6, reference numerals 61 denotes a DTMF tone sensing unit, 62 an input/output changeover switch, 67 A/D.D/A converters, 68 a speech compressor/expander, and 69 a TCP protocol unit. In FIG. 7, reference numeral 71 denotes a user ID, 72 a password, and 73 user specific information.

In the present embodiment, the same effect as the first embodiment is obtained by using the ordinary telephone sets 51 and 56 instead of the Internet phones used in the first embodiment. From the telephone set 51, a user originates a call to the ISPA 52. By using the voice guidance notification unit 24, the ISPA 52 issues a voice guidance message for asking whether the telephone set is an ordinary telephone set, such as "In the case of an ordinary telephone set, enter your user ID and authentication password. In the case of an Internet phone, hold on, please."

If the user ID and the authentication password are sensed by the DTMF sensing unit 61, the host 13 is notified of the user ID and the authentication password. By using an ordinary telephone judging unit, the host CPU 31 determines whether it can be used by an ordinary telephone set on the basis of the user ID 71 and the password 72 of the database. The host CPU 31 returns a result of the judgment. If the result is OK, the ISPA 52 acquires the telephone number of the other party in the same way as the first embodiment. After acquiring the telephone number, the ISPA 52 changes over the ordinary public line input/output changeover switch 62, converts the speech to digital signals by using the A/D converter 67, conducts speech compression by using a speech compression/expansion unit 68, and converts the compressed speech into a packet form by using the TCP protocol unit 69. In addition, the ISPA 52 notifies the host 13 of the telephone number of the other party. By referring to the information 73 of the database, the host CPU 31 knows whether or not the other party is an ordinary telephone set.

In the same way as the first embodiment, the host CPU 31 knows the nearby ISPA 55 of the other party, gives notice of the nearby ISPA of the other party to the ISPA 52 of the calling side, and gives notice of the ISPA of the calling side and the telephone number of the other party to the nearby ISPA of the other party. If the other party is an Internet phone, then the host CPU 31 continues the processing in the same way as the first embodiment, gives notice of the IP address of the ISPA of the calling side to the Internet phone 56 of the other party, and gives notice of the IP address of the terminating side to the ISPA of the calling side. If the other party is an ordinary telephone set, then the host CPU 31 notifies the ISPA 55 of the terminating side of that fact. The ISPA 55 of the terminating side originates a call to the terminating telephone set 56. If call incoming is effected, then the ISPA 55 takes out packeted compressed speech data by using the TCP protocol unit 69, expands the compressed speech data by using the speech compression/expansion unit 68, converts the speech data into ordinary speech by using the D/A converter 67, and sends the ordinary speech to the ordinary public line. In the same way, the calling side also conducts processing. As a result, speech communication via the Internet becomes possible.

The present invention significantly improves the convenience of the conventional Internet phone system provided by the ISP by using Internet servers, and makes it possible to use the Internet phone at low cost.

What is claimed is:

1. An internet phone server device used in a system provided by an Internet service provider connecting an ordinary public telephone line to the Internet, said Internet phone server device comprising:

means for acquiring a terminating telephone number of a terminating telephone from a calling side;

ISPA acquiring means for searching a database on the basis of the acquired telephone number to acquire a nearby ISPA that is nearby the terminating telephone and that communications with the terminating telephone via an ordinary public line, the nearby ISPA calling the terminating telephone on the basis of resultant information of the search;

terminal judging means for determining whether said terminating telephone is an Internet phone or an ordinary telephone; and converting means at the terminating side server for converting packet-form speech data into ordinary speech, wherein when said terminal judging means determines that said terminating telephone is an ordinary telephone, said terminating side server converts said packet-form speech data into said ordinary speech by said converting means to transmit the converted ordinary speech to said terminating telephone; and when said terminal judging means determines that said terminating telephone is an Internet phone, the terminating telephone notifies its own IP address to a calling side server, and the calling side server notifies its own IP address to the terminating telephone.

2. The internet phone server device according to claim 1, wherein the ISPA acquiring means for searching a database includes a host CPU and a host database and host CPU searches the host database to locate the ISPA nearby the terminating telephone.

3. A talking system using a data communication network comprising:

telephone number acquiring means for acquiring a terminating telephone number of a terminating terminal from a calling terminal;

access point acquiring means for searching a database on the basis of the acquired terminating telephone number to acquire a nearby access point of the terminating terminal;

calling means for conducting a calling connection from said nearby access point terminal to the terminating terminal;

terminal judging means for judging whether said terminating terminal is an Internet phone or an ordinary telephone; and converting means at the terminating side server for converting packet-form speech data into ordinary speech, wherein when said terminal judging means determines that said terminating terminal is an ordinary telephone, said terminating side server converts said packet-form speech data into said ordinary speech by said converting means to transmit the converted ordinary speech to said terminating terminal; and when said terminal judging means determines that said terminating terminal is an Internet phone, the terminating terminal notifies its own IP address to a calling side server, and the calling side server notifies its own IP address to the terminating terminal.

4. A talking system according to claim 3, wherein said data communication network is the Internet.

5. A talking system according to claim 3, wherein the terminating terminal is an Internet phone that includes a computer and that communicates with the nearby access point using the TCP/IP protocol.

6. A talking system according to claim 3, wherein the calling terminal is an Internet telephone that includes a computer, and wherein the telephone number acquiring means comprises means for sending a message to the calling terminal, the message being conveyed to the terminal using the TCP/IP protocol and requesting that the terminating telephone number be identified by DTMF signaling.

7. The internet phone server device according to claim 3, wherein the access point acquiring means for searching a database includes a host CPU and a host database and the host CPU searches the host database to locate the access point nearby the terminating telephone.

8. A talking system comprising at least two server devices and a data communication network interconnecting the server devices, wherein:

one of the server devices comprises connection means for connection to a calling terminal, telephone number acquiring means for acquiring a telephone number of a terminating terminal from said calling terminal, and access point acquiring means for acquiring a nearby access point that is nearby said terminating terminal and that corresponds to said telephone number from a database; and the other of the server devices corresponds to said nearby access point, and comprises acquiring means for acquiring said telephone number of the terminating terminal from said one of the server devices, calling means for originating a call to said telephone number, terminal judging means for judging whether said terminating terminal is an Internet phone or an ordinary telephone, and converting means for converting packet-form speech data into ordinary speech, wherein when said terminal judging means determines that said terminating terminal is an ordinary telephone, the other of the server devices converts said packet-form speech data into said ordinary speech by said converting means to transmit the converted ordinary speech to said terminating terminal; and when said terminal judging means determines that said terminating terminal is an Internet phone, the other of the server devices notifies an IP address of the terminating terminal to said one of the server devices, and notifies an IP address of said one of the server devices to the terminating terminal.

9. A talking system according to claim 8, wherein said data communication network is the Internet.

10. A talking system according to claim 8, wherein the calling terminal and the terminating terminal are Internet telephones that include computers, the calling terminal communicating with said one of the server devices at least in part using the TCP/IP protocol, and the terminating terminal communicating with said other of the server devices at least in part using the TCP/IP protocol.

11. A talking system according to claim 8, wherein the calling terminal is an Internet phone that includes a computer, and wherein the telephone number acquiring means comprises means for sending a message to the calling terminal, the message being conveyed to the calling terminal using the TCP/IP protocol and requesting that the telephone number of the terminating terminal be identified.

12. A talking system according to claim 11, wherein the calling terminal identifies the telephone number of the terminating terminal using DTMF signaling.

13. The internet phone server device according to claim 8, wherein the access point acquiring means for acquiring a nearby access point includes a host CPU, the database is a host database associated with the host CPU and the host CPU searches the host database to locate the access point nearby the terminating telephone.

* * * * *